United States Patent [19]

Laud

[11] Patent Number: 4,764,839

[45] Date of Patent: Aug. 16, 1988

[54] LOW VOLTAGE RESET CIRCUIT

[75] Inventor: Timothy G. Laud, Mundelein, Ill.

[73] Assignee: Zenith Electronics Corporation, Glenview, Ill.

[21] Appl. No.: 1,932

[22] Filed: Jan. 8, 1987

[51] Int. Cl.[4] .............................................. H02H 3/24
[52] U.S. Cl. ........................................ 361/92; 361/88; 340/661; 307/296.4; 307/592
[58] Field of Search .................... 361/86, 91, 110, 111, 361/92, 88, 90; 340/661; 307/250 A, 592, 296 R

[56] References Cited
U.S. PATENT DOCUMENTS 4,520,418  5/1985  Susi ........................................ 361/92

Primary Examiner—G. P. Tolin

[57] ABSTRACT

A low voltage reset circuit includes a first transistor having a base connected to a voltage divider and an emitter connnected to the junction of a resistor-diode arrangement such that when the supply voltage falls to a trigger voltage level, the transistor is driven conductive. A second transistor is connected to the collector of the first transistor and is driven conductive therewith for applying a reset voltage to the reset terminal of a microprocessor. The collector of the second transistor is returned through a resistor to the base of said first transistor to provide positive feedback such that the first transistor is maintained in conduction until the supply voltage rises above the trigger voltage level.

4 Claims, 1 Drawing Sheet

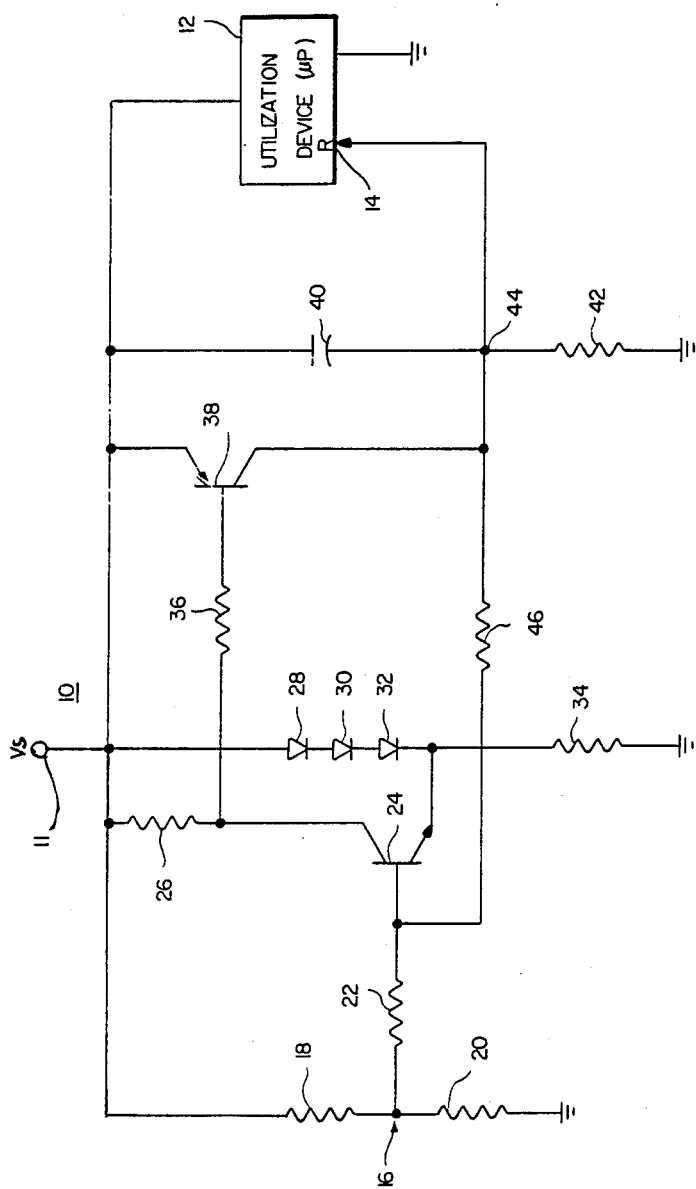

LOW VOLTAGE RESET CIRCUIT

BACKGROUND OF THE INVENTION AND PRIOR ART

This invention relates generally to reset circuits and particularly to a reset circuit that operates reliably down to two volts DC.

There are many prior art circuits available for establishing and maintaining a reset condition in a voltage sensitive utilization device, in the event the supply voltage drops to a level where functioning of the utilization device may become unreliable. While the circuit of the invention is particularly useful with microprocessors, it will find application in any circuit where logic gates are being controlled and where, under low voltage supply conditions, their operation may become unstable or unreliable.

Many prior art circuits utilize zener diodes to establish a reference potential at which a reset signal is developed or a reset condition is otherwise established. Two difficulties are encountered, the first being that a zener diode is generally not operable below three volts DC, and secondly, that its voltage breakdown characteristic has what is called a "soft knee" which makes for somewhat unstable operation in that area. A reset arrangement for a microprocessor circuit, for example, must operate at a trigger voltage level that is high enough to insure that the microprocessor is still operating reliably. The reset condition or signal must then be maintained until the operating potential is again at a sufficient level to assure that the microprocessor will operate reliably. For example, a conventional "5 volt" microprocessor becomes unstable if the voltage drops to 3 volts. A reset circuit should, therefore, desirably be initiated when the voltage drops to a trigger level of about 3.5 volts and be maintained for a voltage down to 2 or 2.5 volts. It is also highly desirable that the reset circuit maintain the microprocessor in a reset condition until the supply voltage rises to a level at which the microprocessor will operate reliably, preferably a level that is above the trigger level. None of the prior art circuits fulfill the above conditions.

Further, it is also desirable that the reset circuit respond very quickly so that momentary voltage drops in voltage will not result in erroneous data or information from the microprocessor controlled circuit or other utilization device. It is also further desirable that such a circuit be fairly simple and economical. The present invention circuit satisfies all of these needs.

OBJECTS OF THE INVENTION

A principal object of the invention is to provide a novel, low voltage reset circuit.

Another object of the invention is to provide a reset circuit that is reliable in operation during "brown out" voltage conditions as well as during momentary drops in supply voltage.

A further object of the invention is to provide a reset circuit that, when activated, will maintain its reset state until the supply voltage is restored to a safe operating level.

BRIEF DESCRIPTION OF THE DRAWING

These and other objects and advantages of the invention will be apparent upon reading the following description in conjunction with the drawing, the single FIGURE of which is a schematic diagram of the reset circuit of the invention.

DESCRIPTION OF THE PREFERRED EMBODIMENT

The inventive circuit includes an NPN transistor having its base connected to a resistive voltage divider that is coupled across the supply voltage and its emitter connected to the junction of a diode string and a resistor, also connected across the supply voltage. For voltage drops in the supply voltage, the potential applied to the emitter decreases more than the potential applied to the base. At the desired voltage trigger level, the transistor is driven into conduction to develop a reset signal. A positive feedback arrangement provides additional current for the base-emitter junction of the transistor such that the transistor is maintained in conduction until the supply voltage rises above the low voltage trigger point by a predetermined amount. Thus, the reset condition is maintained until the supply voltage again reaches a point where the utilization device will operate reliably.

The reset circuit of the invention, generally designated 10, is connected to a voltage source terminal 11. A supply voltage Vs is made available by means (not shown) coupled across terminal 11 and ground. A voltage divider 16 comprising a pair of serially connected resistors 18 and 20 is coupled between voltage terminal 11 and ground. The junction of voltage divider 16 is connected through a resistor 22 to the base of an NPN transistor 24, the collector of which is connected to terminal 11 through a load resistor 26 and the emitter of which is connected to ground through a resistor 34. The emitter of transistor 24 is also connected to voltage terminal 11 through a series connected diode string consisting of three diodes 28, 30 and 32. The output of the collector of transistor 24 is supplied through a resistor 36 to the base of a PNP transistor that has its emitter connected to voltage terminal 11 and its collector connected to a junction 44. Junction 44 is established by a series arrangement of a capacitor 40 and a resistor 42 connected between voltage terminal 11 and ground. The collector of transistor 38 is also returned in a positive feedback connection through a resistor 46 to the base of transistor 24. Finally, a utilization device 12, which is preferably a microprocessor, is connected to voltage terminal 11 and has a reset terminal 14 that is coupled to junction 44.

It will be appreciated that the elements of the reset circuit are all standard components. For the embodiment illustrated, using a type 8044 microprocessor as utilization device 12, the reset circuit will trigger at 3.85 volts and release at 4.1 volts. The reset condition will be maintained down to approximately 2 volts. To achieve this operation, Vs is +5 volts, resistors 20, 34 and 36 are 4700 ohms, resistor 18 is 1800 ohms, resistor 22 is 10,000 ohms, resistor 26 is 27,000 ohms and resistor 46 is 470,000 ohms. The diodes are ordinary silicon type devices with forward conduction voltages of 0.65–0.7 volts. Below a supply voltage of 2 volts, the circuit element fails to operate, and it is of no real interest whether a reset condition is maintained. In the event of such a failure, the reset circuit will be reinitiated to force a reset condition when the supply voltage again rises about 2 volts.

Under normal operation, where Vs is above the trigger voltage level, the DC potential at the base of transistor 24 is less than the DC potential at its emitter and transistor 24 is in an "off" condition. Transistor 38 is also non-conductive and the voltage at junction 44 is at ground. When Vs falls, either instantaneously or during a slow "brown out" condition, to the trigger voltage level, transistor 24 is driven conductive and a reset signal is developed at its collector. Transistor 24 thus comprises low voltage trigger means. The reset signal forward biases transistor 38 which is driven conductive and rapidly discharges capacitor 40. Junction 44 rises to Vs and applies the reset signal to the reset terminal 14 of utilization device 12. Simultaneously, the voltage at junction 44 is applied through feedback resistor 46 to forward bias transistor 24 and to assure that the reset signal is maintained. Transistor 38 and the feedback circuit function as holding means to maintain the low voltage trigger means activated. As Vs continues to fall, the low voltage trigger means maintains the reset signal on terminal 14. The reset circuit will stay in its switched conductivity state until a voltage level is reached where the microprocessor (or other utilization device) will fail to operate at all. Such a voltage may be around 3 volts. Because of the bias arrangement used, that is, the three diodes 28, 30 and 32, a Vs of slightly over 2 volts can maintain conduction in transistor 24, depending upon the ratio of resistors 18 and 20, which is sufficiently low to guarantee no unreliable operation of the microprocessor.

Should the supply voltage rise, the added forward bias current supplied through resistor 46 to the base of transistor 24 will keep transistor 24 in conduction past the trigger voltage level. For the values given, the voltage Vs will rise to approximately 4.1 volts, which is about 0.16 volts above the trigger voltage level, before the reset signal is released by transistor 24 again switching conductivity states. Thus, the reset signal on terminal 14 will not be removed or released until the supply voltage has reached 4.1 volts, which is higher than the trigger voltage, thus assuring that the utilization device will operate properly before the reset is removed.

It will be appreciated that the trigger voltage level may be changed by utilizing different values for the resistors. Also, the restoration voltage may be adjusted by appropriate changes in the feedback circuit. It is thus recognized that numerous changes and modifications in the described embodiment of the invention may be made by those skilled in the art without departing from its true spirit and scope. The invention is to be limited only as defined in the claims.

What is claimed is:

1. A reset circuit comprising:
   a voltage source;
   a utilization device connected to said voltage source and including a reset terminal;
   a low voltage trigger means including a first transistor coupled to said voltage source for supplying a reset signal to said reset terminal when the voltage from said voltage source falls to a trigger voltage level; and
   holding means including a second transistor coupled by a feedback resistor to said low voltage trigger means and being driven conductive responsive to activation of said first transistor for causing said first transistor to maintain said reset signal until voltage from said voltage source rises above said trigger voltage level.

2. The circuit of claim 1 wherein said first transistor in said low voltage trigger means changes from a first conductivity state to a second conductivity state responsive to said voltage source falling below said trigger voltage level and wherein said second transistor in said holding means prevents said first transistor from reverting to said first conductivity state.

3. The circuit of claim 2, further including a bias arrangement comprising a voltage divider coupled across said voltage source and connected to the base of said first transistor and a diode reference circuit coupled across said voltage source and connected to the emitter of said first transistor.

4. A reset circuit comprising:
   a voltage source;
   microprocessor means connected across said voltage source and including a reset terminal;
   resistive voltage divider means connected across said voltage source and having a junction;
   a series circuit comprising diode means and resistor means connected across said voltage source;
   a first transistor having a base connected to said junction of said resistive voltage divider means, an emitter connected between said diode means and said resistor means and a collector;
   a second transistor coupled to said collector of said first transistor and being driven conductive responsive to conduction of said first transistor for applying a reset signal to said reset terminal; and
   a feedback resistor connected from said reset terminal to said base of said first transistor, whereby said reset signal is established when the voltage from said voltage source falls to a trigger voltage level and is maintained until the voltage from said voltage source rises above said trigger voltage level.

* * * * *